United States Patent [19]

Inage et al.

[11] Patent Number: 5,998,993
[45] Date of Patent: Dec. 7, 1999

[54] METHOD AND APPARATUS FOR TESTING MAGNETIC HEAD WITH SPIN-VALVE MAGNETORESISTIVE ELEMENT

[75] Inventors: Kenji Inage; Nozomu Hachisuka; Masanori Sakai, all of Nagano, Japan

[73] Assignee: TDK Corporation, Tokyo, Japan

[21] Appl. No.: 09/035,946

[22] Filed: Mar. 6, 1998

[30] Foreign Application Priority Data

Mar. 21, 1997 [JP] Japan .................................. 9-085556

[51] Int. Cl.$^6$ .......................... G01R 33/12; G01N 27/72; G11B 5/455
[52] U.S. Cl. ............................................ 324/210; 324/223
[58] Field of Search ..................................... 324/210, 211, 324/212, 222, 223, 235, 232; 360/113; 338/32 R

[56] References Cited

U.S. PATENT DOCUMENTS 5,206,590  4/1993  Dieny et al. .
5,422,571  6/1995  Gurney et al. .

*Primary Examiner*—Walter E. Snow
*Attorney, Agent, or Firm*—Nikaido, Marmelstein, Murray & Oram LLP

[57] ABSTRACT

A method of testing a magnetic head with a spin-valve MR element which includes at least a pinned layer, a free layer and a non-magnetic layer for magnetically separating the pinned layer and the free layer. The method includes a step of measuring an output voltage of the spin-valve MR element under application of an external alternating magnetic field to the magnetic head in a direction parallel to a magnetization direction of the pinned layer, a step of obtaining a ρ-H loop characteristics of the spin-valve MR element from the measured output voltage, and a step of judging pinned direction of the spin-valve MR element in accordance with a polarity of an inclination of the obtained ρ-H loop characteristics.

9 Claims, 8 Drawing Sheets

METHOD AND APPARATUS FOR TESTING MAGNETIC HEAD WITH SPIN-VALVE MAGNETORESISTIVE ELEMENT

FIELD OF THE INVENTION

The present invention relates to a method and apparatus for testing a magnetic head with a magnetoresistive (MR) element utilizing the spin-valve effect.

DESCRIPTION OF THE RELATED ART

Due to the recent demand for higher density in a hard disk device (HDD), it has been required to develop a high sensitive and high power output magnetic head. To serve the requirements, a magnetic head with a spin-valve element which is one of elements providing the giant MR effect is provided (U.S. Pat. Nos. 5,206,590 and 5,422,571).

The spin-valve element has a sandwiched structure with two ferromagnetic material thin-film layers magnetically separated by a non-magnetic material thin-film layer. An antiferromagnetic material thin-film layer is deposited on and in contact with one of the two uncoupled ferromagnetic layers so as to produce an exchange biasing magnetic field at their boundary and to apply the biasing magnetic field to this ferromagnetic layer. Therefore, this one ferromagnetic layer (pinned layer) receives the biasing magnetic field, whereas the other ferromagnetic layer (free layer) receives no biasing magnetic field so that magnetization switching (inversion) is introduced by different magnetic fields between the two ferromagnetic layers. The magnetization directions of the two ferromagnetic layers (pinned and free layers) therefore change between in parallel and in antiparallel with each other so that the electrical resistivity of this spin-valve MR element greatly varies to obtain the giant MR effects.

Output characteristics of this spin-valve MR element is determined depending upon an angle between magnetization directions in the two ferromagnetic layers (pinned and free layers). The magnetization direction in the free layer is easily changed in response to the direction of magnetic field from a magnetic record medium, whereas the magnetization direction in the pinned layer is fixed to one direction (pinned direction) by means of the exchange coupling with the antiferromagnetic layer.

If the pinned direction changes from its correct direction, the angle between the magnetization directions in the pinned layer and the free layer changes causing the output characteristics to deteriorate. Thus, for the magnetic head with the spin-valve MR element, it is very important to control the pinned direction at the correct direction.

However, there is no technology for easily detecting with reliability whether the pinned direction of the spin-valve MR head is correctly controlled. This may cause some problems in mass production of HDDs. Namely, when some electric charges are applied to the terminals of the MR elements due to certain reason during manufacturing processes such as the wafer process of the magnetic heads and the mechanical working process, or during assembling processes of completed heads to the HDD, the pinned direction of the spin-valve MR element may be changed or inverted and thus various characteristics of the head may vary causing incorrect reproduction of the magnetically recorded signal. The change or inversion of the pinned direction may be caused by heat and magnetic field generated by the applied electric charges.

SUMMARY OF THE INVENTION

It is therefore an object of the present invention to provide method and apparatus for testing a magnetic head with a spin-valve MR element, whereby whether the pinned direction of the spin-valve MR head is correctly controlled can be easily detected with reliability.

According to the present invention, a method of testing a magnetic head with a spin-valve MR element which includes at least a pinned layer, a free layer and a non-magnetic layer for magnetically separating the pinned layer and the free layer is provided. The method includes a step of measuring an output voltage of the spin-valve MR element under application of an external alternating magnetic field to the magnetic head in a direction parallel to a magnetization direction of the pinned layer, a step of obtaining a $\rho$-H loop characteristics of the spin-valve MR element from the measured output voltage, and a step of judging pinned direction of the spin-valve MR element in accordance with a polarity of an inclination of the obtained $\rho$-H loop characteristics.

In the present invention, a $\rho$-H loop characteristics of the spin-valve MR element is obtained, and then, in accordance with the polarity of the inclination of the characteristics, the pinned direction of the element is judged. Thus, whether the pinned direction of the spin-valve MR element to be tested is correct or incorrect can be easily detected with reliability.

It is preferred that the judging step includes a step of detecting a polarity of an inclination of the $\rho$-H loop characteristics in the vicinity of zero magnetic field at plurality of times, and a step of judging pinned direction of the spin-valve MR element in accordance with the plurality of detected polarities.

It is also preferred that the judging step includes a step of detecting whether a polarity of an inclination of the $\rho$-H loop characteristics in the vicinity of zero magnetic field is positive or negative at plurality of times to count the number of positive polarities and the number of negative polarities, and a step of judging pinned direction of the spin-valve MR element by comparing the counted number of positive polarities and the counted number of negative polarities.

It is preferred that the method further includes a step of determining a correct polarity of the inclination of the $\rho$-H loop characteristics, and that the judging step includes a step of judging whether the pinned direction of the spin-valve MR element is correct or incorrect by comparing the measured polarity with the determined correct polarity.

According to the present invention, also, an apparatus for testing a magnetic head with a spin-valve MR element which includes at least a pinned layer, a free layer and a non-magnetic layer for magnetically separating the pinned layer and the free layer is provided. The apparatus includes a unit for applying an external alternating magnetic field to the magnetic head in a direction parallel to a magnetization direction of the pinned layer, a unit for supplying sense current with a constant value to the spin-valve MR element, a unit for obtaining a $\rho$-H loop characteristics of the spin-valve MR element by measuring an output voltage of the spin-valve MR element, and a unit for judging pinned direction of the spin-valve MR element in accordance with a polarity of an inclination of the obtained $\rho$-H loop characteristics.

It is preferred that the judging unit includes a unit for detecting a polarity of an inclination of the $\rho$-H loop characteristics in the vicinity of zero magnetic field at plurality of times, and a unit for judging pinned direction of the spin-valve MR element in accordance with the plurality of detected polarities.

It is also preferred that the judging unit includes a unit for detecting whether a polarity of an inclination of the $\rho$-H loop characteristics in the vicinity of zero magnetic field is positive or negative at plurality of times to count the number of positive polarities and the number of negative polarities, and a unit for judging pinned direction of the spin-valve MR element by comparing the counted number of positive polarities and the counted number of negative polarities.

It is preferred that the apparatus further includes a unit for determining a correct polarity of the inclination of the ρ-H loop characteristics, and that the judging unit includes a unit for judging whether the pinned direction of the spin-valve MR element is correct or incorrect by comparing the measured polarity with the determined correct polarity.

Preferably, a plurality of the spin-valve MR elements with output terminals are aligned on a head block, and the apparatus further includes a probe unit, connected to the supplying unit and the obtaining unit, for electrically contacting with the output terminals of one of the spin-valve MR elements on the head block.

Further objects and advantages of the present invention will be apparent from the following description of the preferred embodiments of the invention as illustrated in the accompanying drawings.

DESCRIPTION OF THE PREFERRED EMBODIMENTS

Before describing the embodiments of the present invention, basic principle of the present invention will be explained.

Figure 1:
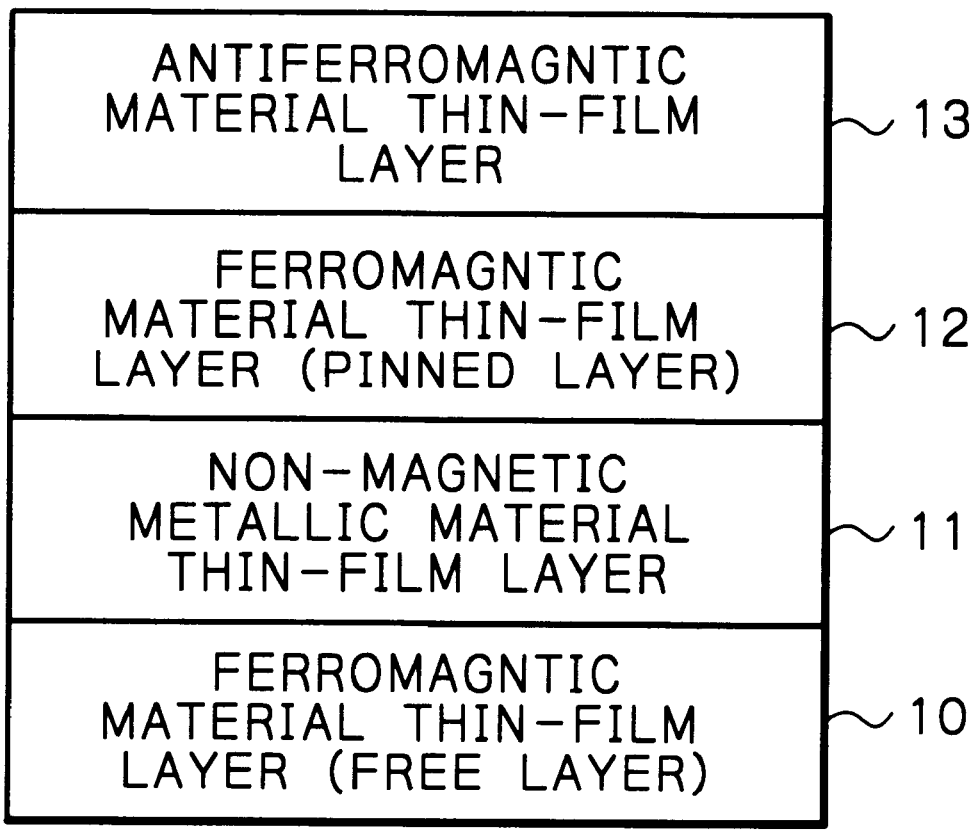
FIG. 1 shows a cross-sectional view illustrating a basic configuration of a multi-layered spin-valve structure.

In FIG. 1 illustrating a multi-layered spin-valve structure of the present invention, reference numerals 10 and 12 are two ferromagnetic material thin-film layers. The multi-layered spin-valve structure has a sandwiched structure with the two layers 10 and 12 magnetically separated with each other by a non-magnetic metallic material thin-film layer 11. On the layer 12 is deposited an antiferromagnetic material thin-film layer 13. Exchange bias magnetic field generated at the interface between the ferromagnetic layer 12 and the antiferromagnetic layer 13 is applied to the ferromagnetic layer (a pinned layer) 12 to pin this layer 12. The layer 10 is a free layer to which no exchange biasing magnetic field is applied.

Figure 2A:
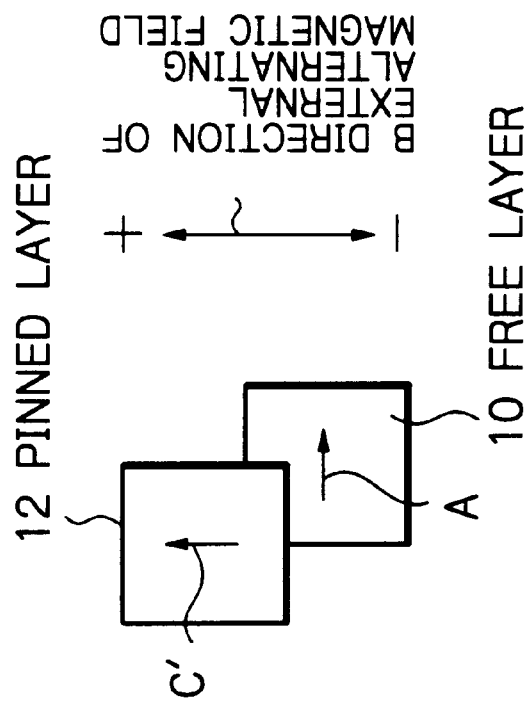
FIGS. 2a and 2b illustrate relationship between the external magnetic field applied to the spin-valve structure and the pinned direction thereof.
Figure 2B:
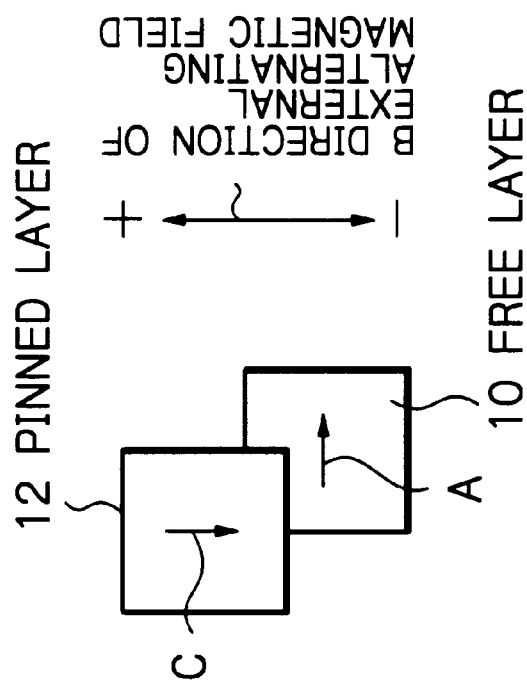
Figure 3A:
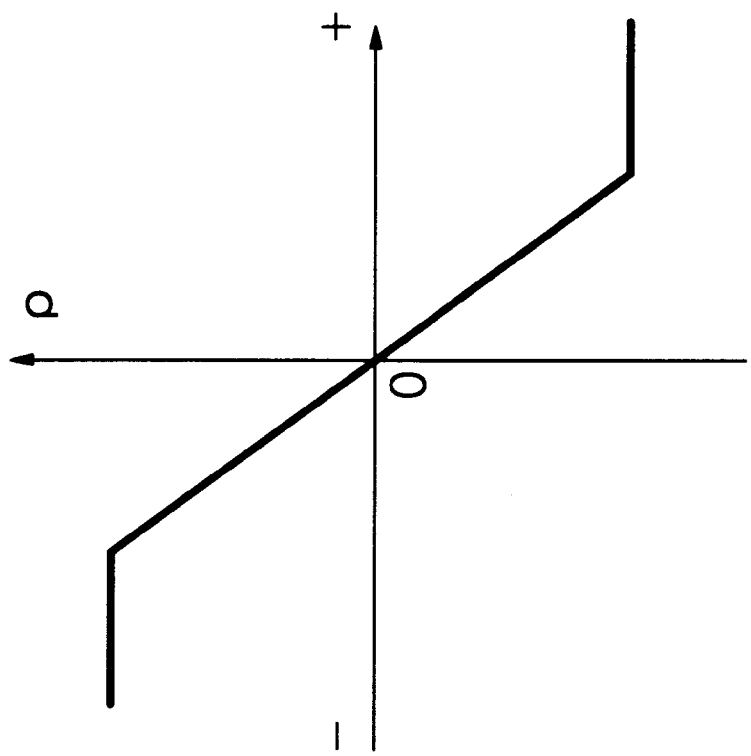
FIGS. 3a and 3b illustrate ρ-H loop characteristics of the spin-valve MR element.
Figure 3B:
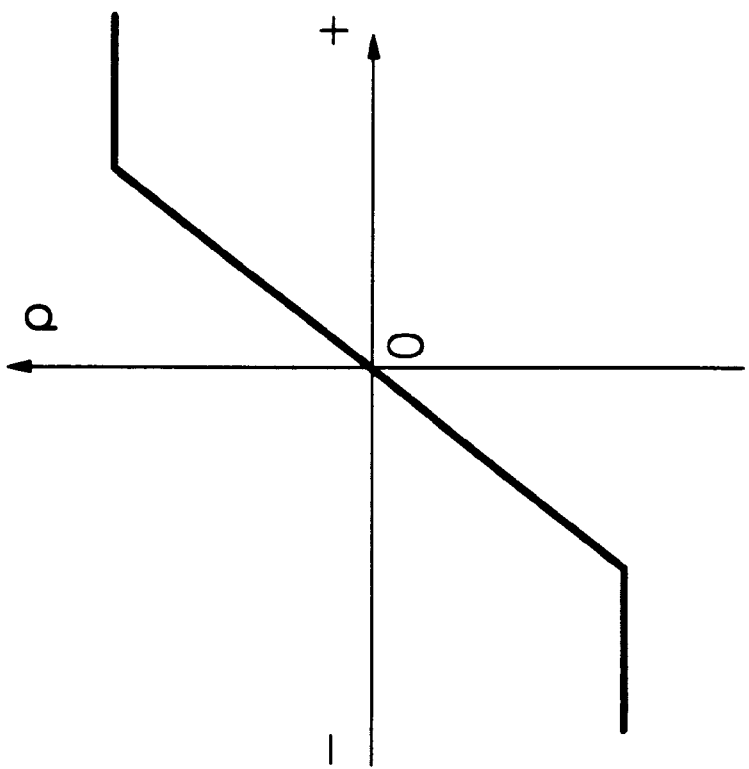

FIGS. 2a and 2b illustrate the relationship between the external magnetic field applied to the multi-layered spin-valve structure and the pinned direction thereof, and FIGS. 3a and 3b illustrate ρ-H loop characteristics of the spin-valve MR element. The free layer 10, which is biased in a direction shown by an arrow A as shown in FIG. 2a, is magnetized in response to a direction, shown by an arrow B, of an externally applied alternating magnetic field H and thus the resistance thereof changes. The resistance change of the free layer 10 when the pinned direction in the pinned layer 12 is as shown by an arrow C in FIG. 2a is opposite in direction to that when the pinned direction in the pinned layer 12 is as shown by an arrow C' in FIG. 2b. Thus, inclinations of the ρ-H loops in these two cases, particularly inclinations of the ρ-H loops near zero magnetic field of these cases, will be different with each other. Namely, when the pinned direction is in a correct direction as shown in FIG. 2a, the inclination of the ρ-H loop in the vicinity of zero magnetic field becomes positive as shown in FIG. 3a. Whereas, when the pinned direction is in the opposite direction as shown in FIG. 2b, the inclination of the ρ-H loop in the vicinity of zero magnetic field becomes negative as shown in FIG. 3b. Therefore, the pinned direction of the spin-valve MR element can be judged by detecting polarity of inclination of the ρ-H loop in the vicinity of zero magnetic field.

Figure 4:
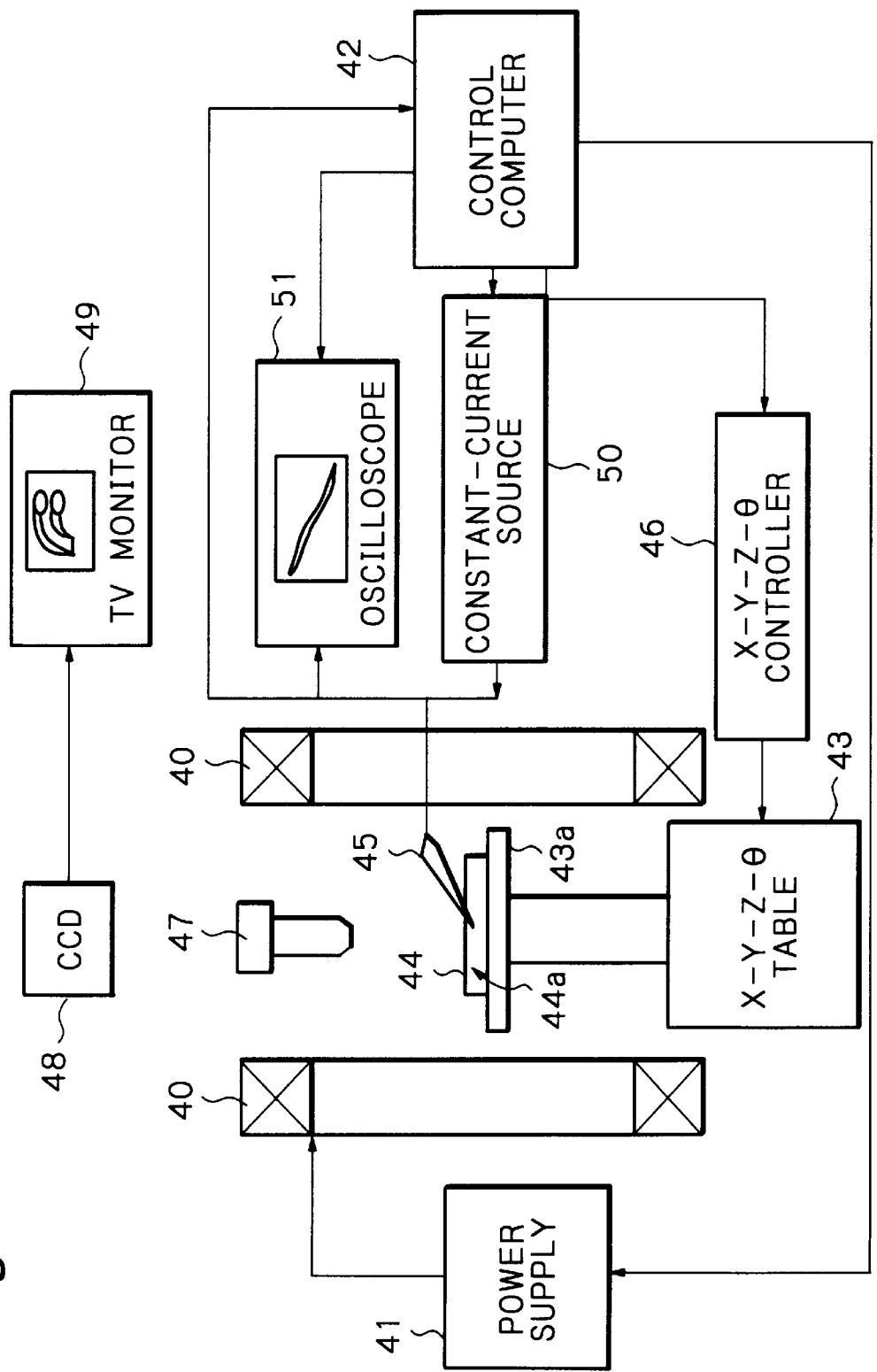
FIG. 4 shows a block diagram schematically illustrating a circuit structure of a preferred embodiment of an apparatus for testing a magnetic head according to the present invention.

In FIG. 4 which schematically illustrates a circuit structure of a preferred embodiment of an apparatus for testing a magnetic head with a spin-valve MR element, reference numeral 40 denotes a Helmholtz coil (air-core coil) for producing an external alternating magnetic field to be applied to the spin-valve MR element. In this embodiment, the Helmholtz coil 40 is arranged such that its longitudinal axis is in parallel with a magnetized direction in a pinned layer of the magnetic head to be tested (horizontal direction in the figure). A power supply 41 for providing exciting current to the Helmholtz coil 40 is electrically connected to the Helmholtz coil 40. This power supply 41 is controlled by a control computer 42. In the Helmholtz coil 40, a platform 43a of a X-Y-Z-θ table 43 and a head block or bar 44 temporally fixed on the platform 43a are disposed. The X-Y-Z-θ table 43 is electrically connected via a X-Y-Z-θ controller 46 to the control computer 42.

The head block 44 is an article in the manufacturing process of the magnetic heads with the spin-valve MR element and has a plurality of the aligned magnetic heads which are not individually separated yet. This head block 44 is provided by forming a large number of the magnetic heads arranged in matrix on a wafer according to thin-film technology, by cutting the wafer into bar shaped blocks so that each block has the aligned magnetic head assemblies, and by grinding an Air Bearing Surface (ABS) 44a of the head block 44 so as to adjust gap-depth of the heads.

Probe pins 45 are fixed at a standstill position and the head block 44 is aligned with the probe pins 45. This alignment is performed by the X-Y-Z-θ table 43 controlled by the X-Y-Z-θ controller 46 so that the probe pins 45 can electrically contact with output terminals of the spin-valve MR element of the desired magnetic head formed on the head block 44. The alignment of the output terminals with respect to the probe pins 45 can be monitored by means of a CCD camera 48 which picks up image of this alignment portion via an optical system 47 such as an objective lens and by means of a TV monitor 49.

The probe pins 45 are electrically connected to a constant-current source 50 for providing a sense current to the spin-valve MR element through the probe pins 45. The probe pins 45 are also connected to an oscilloscope 51 for displaying ρ-H loop of the MR element in accordance with output voltage from the spin-valve MR element and with phase of the alternating magnetic field H obtained from the Helmholtz coil 40. The probe pins 45 are further connected to the control computer 42 which receives and analyzes the output voltage.

The power supply 41, the X-Y-Z-θ controller 46 and the constant-current source 50 are connected to the computer 42 and perform predetermined processes in response to commands from the computer 42.

Figure 5:
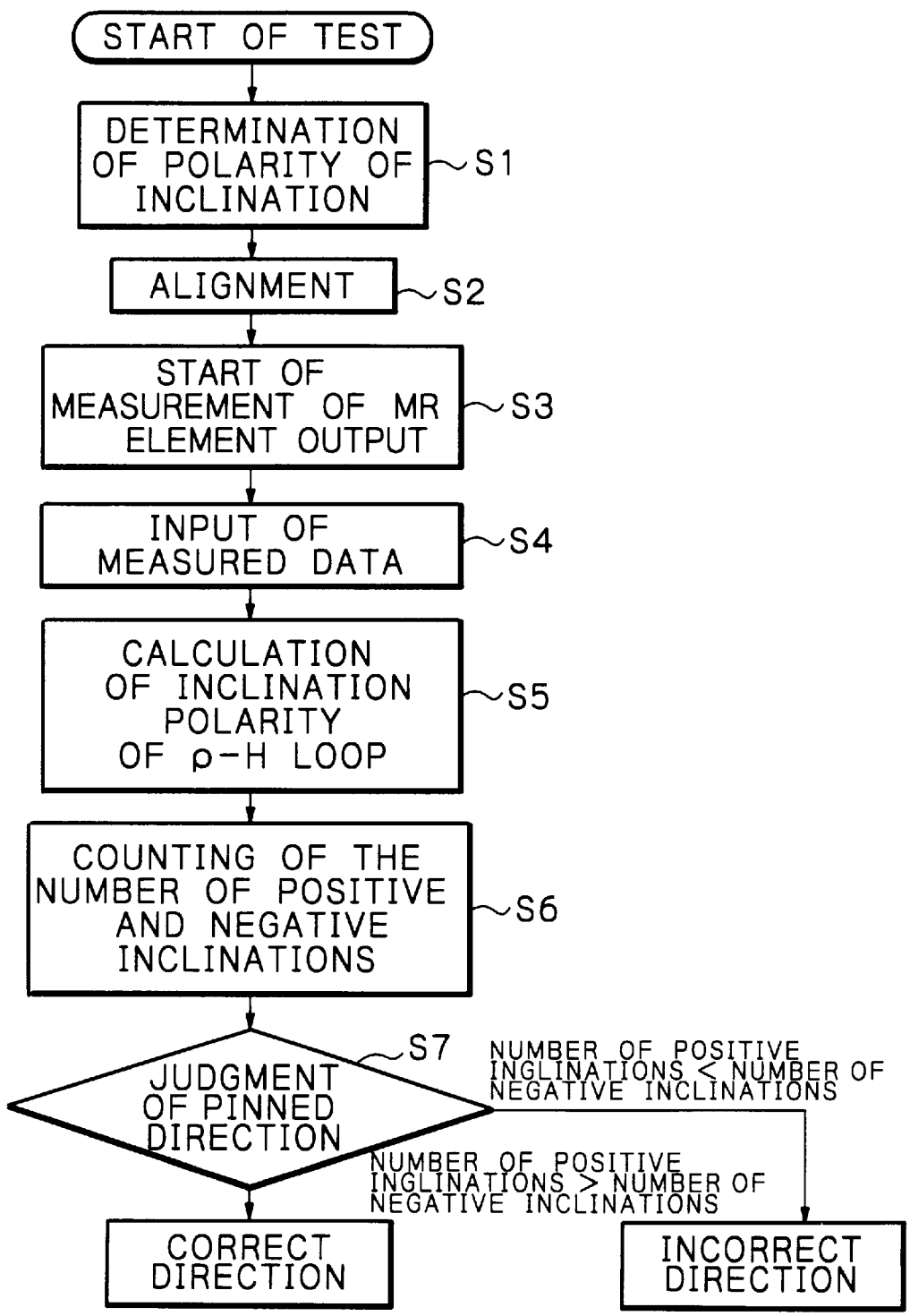
FIG. 5 shows a flow chart schematically illustrating a part of control program of a computer shown in FIG. 4.

Referring to FIG. 5 which schematically illustrates a part of control program of the computer 42, the method of testing the magnetic head with the spin-valve MR element will be described in detail.

First, at step S1, a polarity of inclination of a desired ρ-H loop with respect to the spin-valve MR element of the magnetic head to be tested is determined in accordance with information of the correct pinned direction of the MR element to be tested, information of positive and negative of the alternating magnetic field applied from the Helmholtz coil 40 and information of polarity of the sense current. In the following description, it is assumed that the correct polarity of the inclination of the ρ-H loop is positive.

Then, at step S2, alignment of the output terminals of the spin-valve MR element of the magnetic head to be tested on the head block 44 which is fixed on the platform 43a of the X-Y-Z-θ table 43, with the probe pins 45 is executed. This alignment will be performed by moving the X-Y-Z-θ table 43 in accordance with instruction to the X-Y-Z-θ controller 46 from the computer 42 using an well known alignment technique.

At step S3, measurement of the output voltage from the spin-valve MR element is started. The measurement is executed by instructing the constant-current source 50 to supply the sense current of for example about 4 mA to the spin-valve MR element via the probe pins 45 and also by instructing the power supply 41 to apply external alternating magnetic field to the head block 44 from the Helmholtz coil 40. The sense current may have a predetermined fixed value or adequately varying value. However, the polarity of the sense current applied to the magnetic head should be maintained during testing of this magnetic head. The intensity and frequency of the alternating magnetic field applied to the head block 44 are designated to the power supply 41 from the computer 42. As is well known, the Helmholtz coil 40 produces magnetic field with an intensity which is proportional to the applied current in a direction along its longitudinal axis. Thus, at step S3, magnitude and frequency of drive current are instructed from the computer 42 to the power supply 41. The drive current has an alternating wave shape such as sine wave shape and its frequency is at the commercial frequency or more up to microwave frequency for example.

At step S4, output voltage across the output terminals of the spin-valve MR element, corresponding to resistance of the MR read element, is detected under a condition where the external alternating magnetic field and the sense current are applied to the MR element. The detected output voltage is provided to the computer 42 and then A/D converted into digital input data. At this step S4, detection of a plurality of the output voltage wave shapes in response to the external alternating magnetic field, namely ρ-H loop shapes, should be carried out at predetermined intervals to obtain a plurality of wave shape data. The obtained wave shape data are stored in the computer 42.

At the next step S5, the stored wave shape data is analyzed. Namely, the computer 42 calculates, for each of the stored wave shape data, inclination of the ρ-H loop of the spin-valve MR element so as to detect whether the inclination is positive (correct polarity) or negative (incorrect polarity). Then, at step S6, the number of wave shape data representing positive inclination and the number of wave shape data representing negative inclination are counted, respectively.

Then, at step S7, whether the pinned direction of the spin-valve MR element tested is correct or incorrect is judged. This judgment is executed by comparing the number of the positive inclinations with the number of the negative inclinations. If the number of the positive inclinations is more than the number of the negative inclinations, it is judged that the spin-valve MR element tested has the correct pinned direction. Whereas, if the number of the positive inclinations is less than the number of the negative inclinations, it is judged that the spin-valve MR element tested has the incorrect pinned direction.

If the pinned direction of the all spin-valve MR elements in the head block are correct, this head block will be subjected to next working process. Whereas, the head block having the spin-valve MR element with the incorrect pinned direction will be subjected to pinned direction control again under application of magnetic field and heat, or treated as a defective component.

Figure 6A:
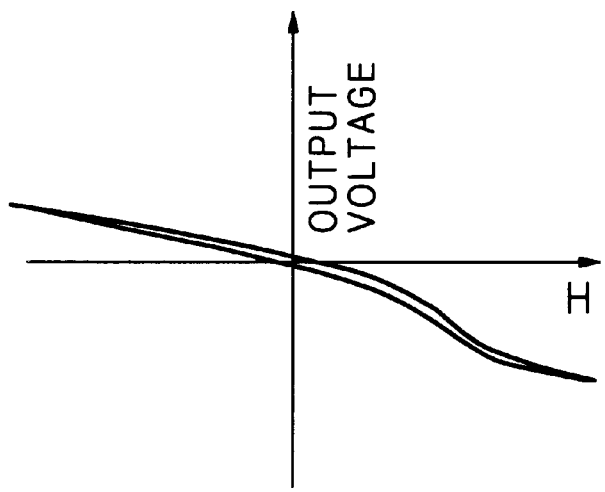
FIGS. 6a to 6c illustrate oscilloscope images of the ρ-H loop characteristics of the spin-valve MR element, measured by the test apparatus of the embodiment shown in FIG. 4.
Figure 6B:
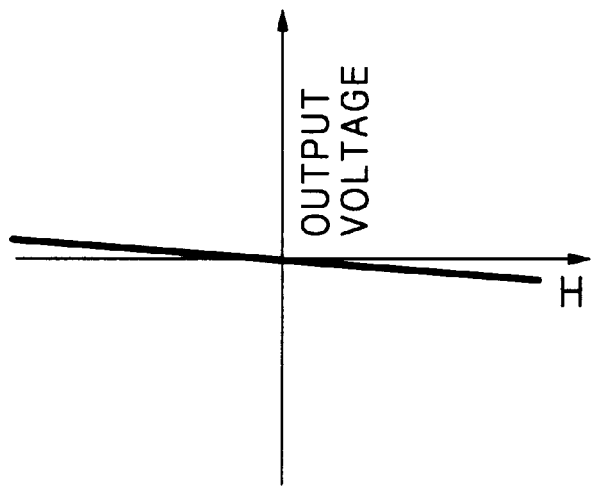
Figure 6C:
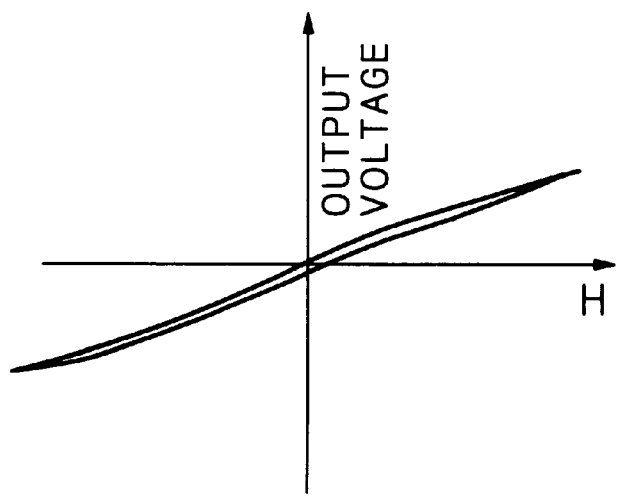

FIGS. 6a to 6c illustrate oscilloscope images of the measured ρ-H loop characteristics of the spin-valve MR element. As illustrated in FIG. 6a, in case of a correct pinned direction, the inclination of the measured ρ-H loop is positive. If external voltage about 14 V is applied to this spin-valve MR element, the measured ρ-H loop more inclines toward the horizontal axis as illustrated in FIG. 6b. As illustrated in FIG. 6c, if the applied external voltage increases to about 15 V, the pinned direction is inverted and the inclination of the measured ρ-H loop becomes negative. As will be noted, according to this embodiment, whether the pinned direction of the spin-valve MR element to be tested is correct or incorrect can be easily detected with reliability by observing the polarity of the inclination of the ρ-H loop of the spin-valve MR element.

In the above-mentioned embodiment, the pinned direction of the spin-valve MR element is tested when the magnetic heads are aligned on and not yet individually separated from the head block 44. However, according to the present invention, the pinned direction can be tested at various timings other than the aforementioned timing.

Figure 7:
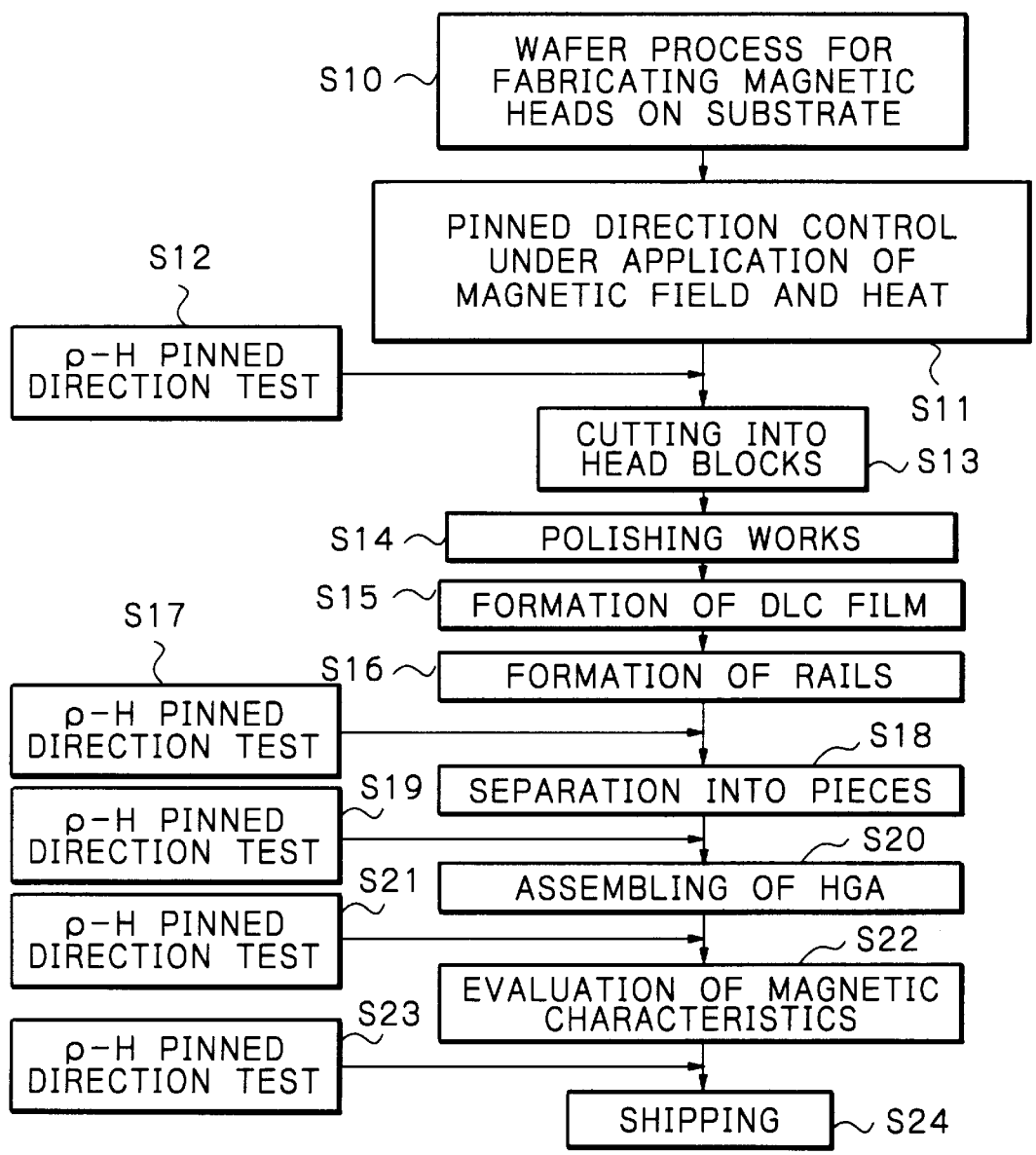
FIG. 7 shows a flow chart of an example for illustrating when the pinned direction test according to the present invention is actually executed.

FIG. 7 illustrates one example of timing when the pinned direction test according to the present invention is actually executed. Step 10 in this figure represents a wafer process in which a number of magnetic heads are fabricated on a substrate by an integration technology. After this wafer process has completed, control of the pinned direction is executed at step S11 under application of magnetic field and heat. Then, at step S12, the pinned direction test by observing the polarity of the inclination of the ρ-H loop according to the present invention may be executed.

Next step S13, step S14, step S15 and step S16 represent a cutting process of the wafer into bar shaped head blocks so that a magnetic head is aligned, a polishing process for adjusting such as a throat height, a film forming process of a DLC (diamond-like carbon) film, and a rail forming process, respectively.

The pinned direction test by observing the polarity of the inclination of the ρ-H loop according to the present invention may be executed at step S17 after the rail forming process at step S16. The aforementioned embodiment executes the test at this timing.

If the pinned direction test is executed before separating the head block into individual magnetic head pieces, the number of processes can be extremely reduced and configuration of the test apparatus can be simplified.

Next step S18 is a cutting process for separating each head block into individual pieces of magnetic heads. After the cutting process at step S18, pinned direction test by observing the polarity of the inclination of the ρ-H loop according to the present invention may be executed at step S19. Next step S20 is an assembling process of HGA (Head Gimbal Assembly) in which each of the magnetic heads is assembled with a gimbal. After this HGA assembling process at step S20, the pinned direction test by observing the polarity of the inclination of the ρ-H loop according to the present invention may be executed at step S21.

Next step S22 is an evaluation process of electro-magnetic conversion characteristics or ρ-H characteristics of the magnetic head assembly. At step S23 after the evaluation process at step S22, the pinned direction test by observing the polarity of the inclination of the ρ-H loop according to the present invention may be executed. At next step S24, thus fabricated magnetic head assembly is shipped.

It should be noted that it is not necessary to execute the pinned direction test at all points described above but it is necessary to execute the pinned direction test at least one point. The later execution of the pinned direction test after the manufacturing process or assembling process, the better probability of obtaining the correct test result with respect to the pinned direction.

Figure 8:
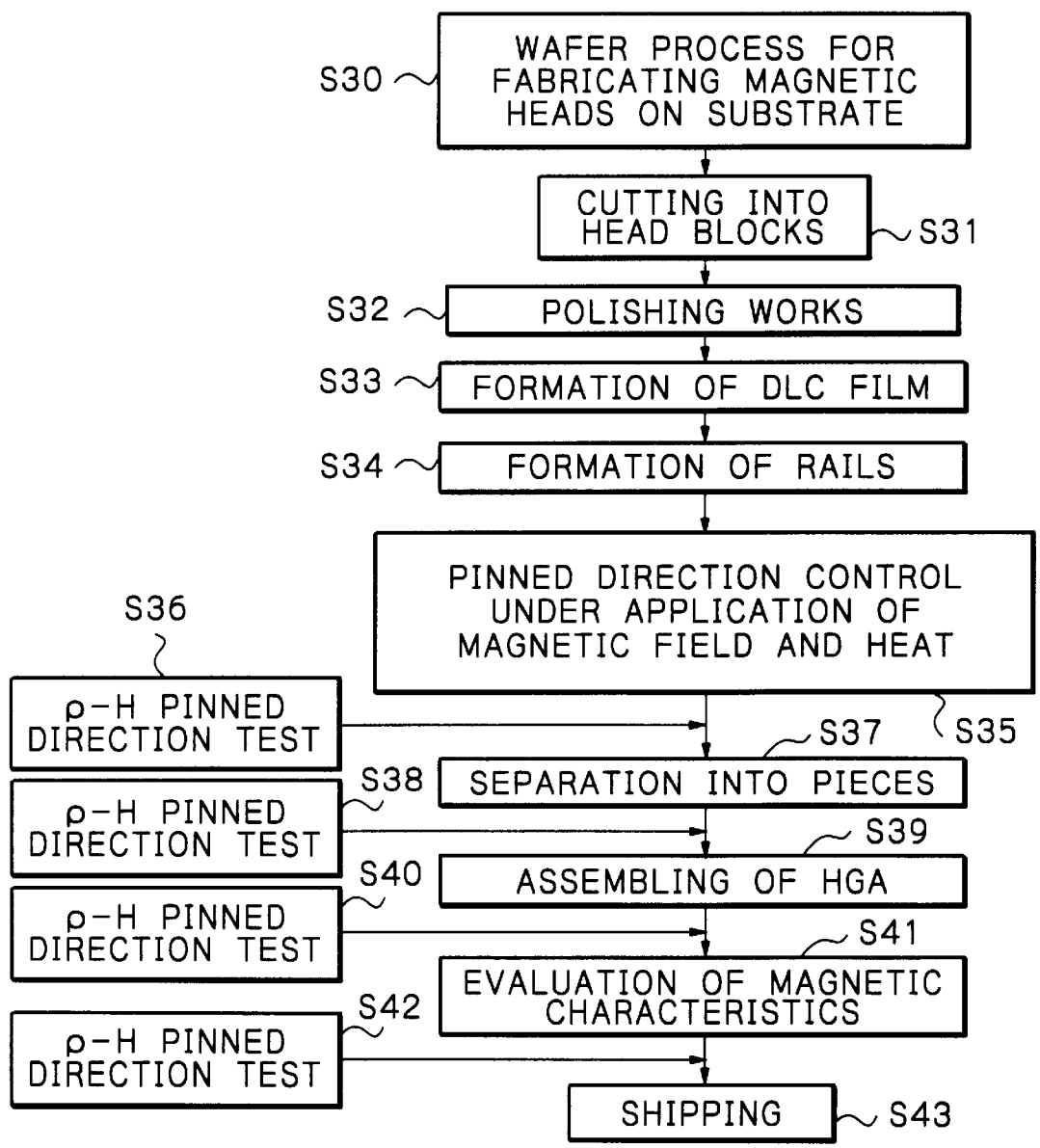
FIG. 8 shows a flow chart of another example for illustrating when the pinned direction test according to the present invention is actually executed.

FIG. 8 illustrates another example of timing when the pinned direction test according to the present invention is actually executed. Step 30 in this figure represents a wafer process in which a number of magnetic heads are fabricated on a substrate by an integration technology. Next step S31, step S32, step S33 and step S34 represent a cutting process of the wafer into bar shaped head blocks so that a magnetic head is aligned, a polishing process for adjusting such as a throat height, a film forming process of a DLC (diamond-like carbon) film, and a rail forming process, respectively. After this rail forming process at step S34 is completed, control of the pinned direction is executed at step S35 under application of magnetic field and heat. Then, at step S36, the pinned direction test by observing the polarity of the inclination of the ρ-H loop according to the present invention may be executed.

Next step S37 is a cutting process for separating each head block into individual pieces of magnetic heads. After the cutting process at step S37, pinned direction test by observing the polarity of the inclination of the ρ-H loop according to the present invention may be executed at step S38. Next step S20 is an assembling process of HGA (Head Gimbal Assembly) in which each of the magnetic heads is assembled with a gimbal. After this HGA assembling process at step S39, the pinned direction test by observing the polarity of the inclination of the ρ-H loop according to the present invention may be executed at step S40.

Next step S41 is an evaluation process of electro-magnetic conversion characteristics or ρ-H characteristics of the magnetic head assembly. At step S42 after the evaluation process at step S41, the pinned direction test by observing the polarity of the inclination of the ρ-H loop according to the present invention may be executed. At next step S43, thus fabricated magnetic head assembly is shipped.

It should be noted that it is not necessary to execute the pinned direction test at all points described above but it is necessary to execute the pinned direction test at least one point. The later execution of the pinned direction test after the manufacturing process or assembling process, the better probability of obtaining the correct test result with respect to the pinned direction.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of testing a magnetic head with a spin-valve magnetoresistive element which includes at least a pinned layer, a free layer and a non-magnetic layer for magnetically separating said pinned layer and said free layer, said method comprising the steps of:

measuring an output voltage of said spin-valve magnetoresistive element under application of an external alternating magnetic field to the magnetic head in a direction parallel to a magnetization direction of said pinned layer;

obtaining a ρ-H loop characteristics of the spin-valve magnetoresistive element from the measured output voltage; and judging pinned direction of the spin-valve magnetoresistive element in accordance with a polarity of an inclination of the obtained ρ-H loop characteristics.

2. The method as claimed in claim 1, wherein said judging step includes a step of detecting a polarity of an inclination of the ρ-H loop characteristics in the vicinity of zero magnetic field at plurality of times, and a step of judging pinned direction of the spin-valve magnetoresistive element in accordance with the plurality of detected polarities.

3. The method as claimed in claim 1, wherein said judging step includes a step of detecting whether a polarity of an inclination of the ρ-H loop characteristics in the vicinity of zero magnetic field is positive or negative at plurality of times to count the number of positive polarities and the number of negative polarities, and a step of judging pinned direction of the spin-valve magnetoresistive element by comparing the counted number of positive polarities and the counted number of negative polarities.

4. The method as claimed in claim 1, wherein said method further comprises a step of determining a correct polarity of the inclination of the ρ-H loop characteristics, and wherein said judging step includes a step of judging whether the pinned direction of the spin-valve magnetoresistive element is correct or incorrect by comparing the measured polarity with the determined correct polarity.

5. An apparatus for testing a magnetic head with a spin-valve magnetoresistive element which includes at least a pinned layer, a free layer and a non-magnetic layer for magnetically separating said pinned layer and said free layer, said apparatus comprising:

means for applying an external alternating magnetic field to the magnetic head in a direction parallel to a magnetization direction of said pinned layer;

means for supplying sense current with a constant value to said spin-valve magnetoresistive element;

means for obtaining a ρ-H loop characteristics of the spin-valve magnetoresistive element by measuring an output voltage of said spin-valve magnetoresistive element; and means for judging pinned direction of the spin-valve magnetoresistive element in accordance with a polarity of an inclination of the obtained $\rho$-H loop characteristics.

6. The apparatus as claimed in claim 5, wherein said judging means includes means for detecting a polarity of an inclination of the $\rho$-H loop characteristics in the vicinity of zero magnetic field at plurality of times, and means for judging pinned direction of the spin-valve magnetoresistive element in accordance with the plurality of detected polarities.

7. The apparatus as claimed in claim 5, wherein said judging means includes means for detecting whether a polarity of an inclination of the $\rho$-H loop characteristics in the vicinity of zero magnetic field is positive or negative at plurality of times to count the number of positive polarities and the number of negative polarities, and means for judging pinned direction of the spin-valve magnetoresistive element by comparing the counted number of positive polarities and the counted number of negative polarities.

8. The apparatus as claimed in claim 5, wherein said apparatus further comprises means for determining a correct polarity of the inclination of the $\rho$-H loop characteristics, and wherein said judging means includes means for judging whether the pinned direction of the spin-valve magnetoresistive element is correct or incorrect by comparing the measured polarity with the determined correct polarity.

9. The apparatus as claimed in claim 5, wherein a plurality of the spin-valve magnetoresistive elements with output terminals are aligned on a head block, and wherein said apparatus further comprises a probe means, connected to said supplying means and said obtaining means, for electrically contacting with the output terminals of one of the spin-valve magnetoresistive elements on the head block.

* * * * *